(12) United States Patent
Takagi et al.

(10) Patent No.: US 8,134,903 B2
(45) Date of Patent: Mar. 13, 2012

(54) METHOD AND APPARATUS FOR DIGITAL DATA ACCOMPANIED BY DEGRADATION

(75) Inventors: Koichi Takagi, Fujimino (JP); Masaru Sugano, Fujimino (JP); Yasuhiro Takishima, Fujimino (JP)

(73) Assignee: KDDI Corporation, Tokyo (JP)

( * ) Notice: Subject to any disclaimer, the term of this patent is extended or adjusted under 35 U.S.C. 154(b) by 1210 days.

(21) Appl. No.: 11/902,112

(22) Filed: Sep. 19, 2007

(65) Prior Publication Data

US 2008/0074979 A1 Mar. 27, 2008

(30) Foreign Application Priority Data

Sep. 22, 2006 (JP) ................................. 2006-257121

(51) Int. Cl.
*G11B 7/00* (2006.01)
(52) U.S. Cl. ........................................ 369/84; 369/47.12
(58) Field of Classification Search ................... 369/83, 369/82, 84, 59.25, 47.12, 47.13, 47.28, 47.35, 369/53.32, 53.33, 53.34, 124.14; 380/201, 380/210, 237; 726/31, 4, 32, 33
See application file for complete search history.

(56) References Cited

U.S. PATENT DOCUMENTS

| 7,102,071 B2 | 9/2006 | Tada |
| 7,130,476 B2 | 10/2006 | Ando et al. |
| 7,356,509 B2 | 4/2008 | Ando et al. |
| 2002/0141582 A1* | 10/2002 | Kocher et al. ................. 380/201 |
| 2003/0216824 A1 | 11/2003 | Chu et al. |

FOREIGN PATENT DOCUMENTS

| JP | 2002-140078 A | 5/2002 |
| JP | 2004-030630 | 1/2004 |
| JP | 2004-86044 A | 3/2004 |

OTHER PUBLICATIONS

Japanese Office Action dated Sep. 8, 2010, issued in corresponding Japanese Patent Application No. 2006-257121.

* cited by examiner

*Primary Examiner* — Nabil Z Hindi
(74) *Attorney, Agent, or Firm* — Westerman, Hattori, Daniels & Adrian, LLP

(57) ABSTRACT

Degraded digital data is distributed from a server 1 to each user A, B, C, and D. An encrypted degradation compensation module is also delivered to the digital data duplicating apparatus 2 for the user A. The digital data duplicating apparatus 2 decrypts the encrypted degradation compensation module using its own encryption key, when playing digital data, to generate a 100% degradation compensation module. This module is applied to the degraded digital data to compensate the degradation thereof. An encrypted degradation compensation module of which the degradation compensation capability is reduced is delivered from the user A to the user B. The user B can use the encrypted degradation compensation module of which the degradation compensation capability is reduced from the user A to replicate the degraded digital data.

5 Claims, 3 Drawing Sheets

|  | DATA 1 (COMPLETE DATA) | DATA 2 (DISTRIBUTED DATA) | DATA 3 (ZERO-TH GENERATION) | DATA 4 (FIRST GENERATION) | DATA 5 (SECOND GENERATION) |
|---|---|---|---|---|---|
| ELEMENT A | ○ | ○ | ○ | ○ | ○ |
| ELEMENT B | ○ | ○ | ○ | ○ | ○ |
| ELEMENT C | ○ | × | ○ | ○ | ○ |
| ELEMENT D | ○ | × | ○ | ○ | × |
| ELEMENT E | ○ | × | ○ | × | × |

METHOD AND APPARATUS FOR DIGITAL DATA ACCOMPANIED BY DEGRADATION

BACKGROUND OF THE INVENTION

1. Field of the Invention

The present invention relates to a method and apparatus for duplicating digital data accompanied by degradation and, in particular, to such a method and apparatus in which duplicated digital data can be degraded like analog data only by exchanging a small amount of data between digital data duplicating apparatuses.

2. Description of the Related Art

Japanese Patent Laid-open publication 2004-30630 proposes a method (apparatus) for self-degrading digital data in which the quality of digital data is degraded with use (copy and/or move) of the digital data so that the digital data cannot be duplicated accurately across several generations.

In this method, digital data is received from a content source and the quality of the digital data is degraded based on a specified quality degradation policy or a degradation specification model. The thus degraded digital data is transmitted to its destination. The quality of the digital data would be further degraded successively with further use of the digital data at the destination and its subsequent stages.

However, in the method above, degraded digital data is duplicated by successively exchanging the digital data itself between digital data duplicating apparatuses, resulting in a problem of requiring a broadband network between the digital data duplicating apparatuses.

SUMMARY OF THE INVENTION

An object of the present invention is to solve the above-described problem and to provide a method and apparatus for duplicating digital data accompanied by degradation in which duplicated digital data can be degraded like analog data only by exchanging a small amount of data between digital data duplicating apparatuses.

In order to accomplish the object, a feature of the method according to the invention is a method for duplicating digital data accompanied by degradation including duplicating a digital data degradation compensation module for compensating the degradation of digital data that is distributed from a content source and degraded reversibly in advance, the method comprising a degradation compensation capability reducing step of reducing the degradation compensation capability of the digital data degradation compensation module.

Here, the degradation compensation capability reducing step may be performed when the digital data degradation compensation module is duplicated or at predetermined time intervals after receiving the digital data degradation compensation module.

Also, the digital data degradation compensation capability may be hierarchized and reduced stepwise.

Further, the digital data degradation compensation module may be encrypted and the degradation compensation capability reducing step may include: a first step of decrypting the digital data degradation compensation module; a second step of reducing the degradation compensation capability of the digital data degradation compensation module that is decrypted in the first step; and a third step of re-encrypting the digital data degradation compensation module that is reduced in the second step.

Also, a feature of the apparatus according to the invention is a digital data duplicating apparatus accompanied by degradation for duplicating digital data that is degraded reversibly in advance, the apparatus comprising:

storage means for obtaining and storing digital data that is distributed from a content source and degraded reversibly in advance;

digital data degradation compensation module obtaining means for obtaining a digital data degradation compensation module for compensating the degradation of the digital data from the content source or another digital data duplicating apparatus;

playing means for compensating the degradation of and outputting the digital data stored in the storage means using the digital data degradation compensation module that is obtained by the digital data degradation compensation module obtaining means; and digital data degradation compensation module duplicating means for reducing the degradation compensation capability of the digital data degradation compensation module that is obtained by the digital data degradation compensation module obtaining means and for duplicating and sending the digital data degradation compensation module.

Here, the digital data degradation compensation module may be encrypted and the digital data degradation compensation module duplicating means may include: decrypting means for decrypting the digital data degradation compensation module that is obtained by the digital data degradation compensation module obtaining means; degradation compensation capability reducing means for reducing the degradation compensation capability of the digital data degradation compensation module that is decrypted by the decrypting means; and encrypting means for re-encrypting the digital data degradation compensation module of which the degradation compensation capability is reduced by the degradation compensation capability reducing means.

In accordance with the method and apparatus for duplicating digital data accompanied by degradation according to the present invention, degradation during data replication that may occur in the analog world can be achieved in the digital world. That is, digital data can be duplicated while being degraded.

Also, since degraded digital data only exchanges a digital data degradation compensation module between digital data duplicating apparatuses, there is no need to provide a broadband network line between the digital data duplicating apparatuses.

In addition, since digital data distributed from the content source is degraded in advance to be distributed and it is difficult to compensation the degradation without the digital data degradation compensation module, the security can be ensured sufficiently. Further, since the degraded digital data can be played even if there is no digital data degradation compensation module, it can be expected to encourage users to acquire a digital data degradation compensation module legally.

DETAILED DESCRIPTION OF THE PREFERRED EMBODIMENTS

Figure 1:
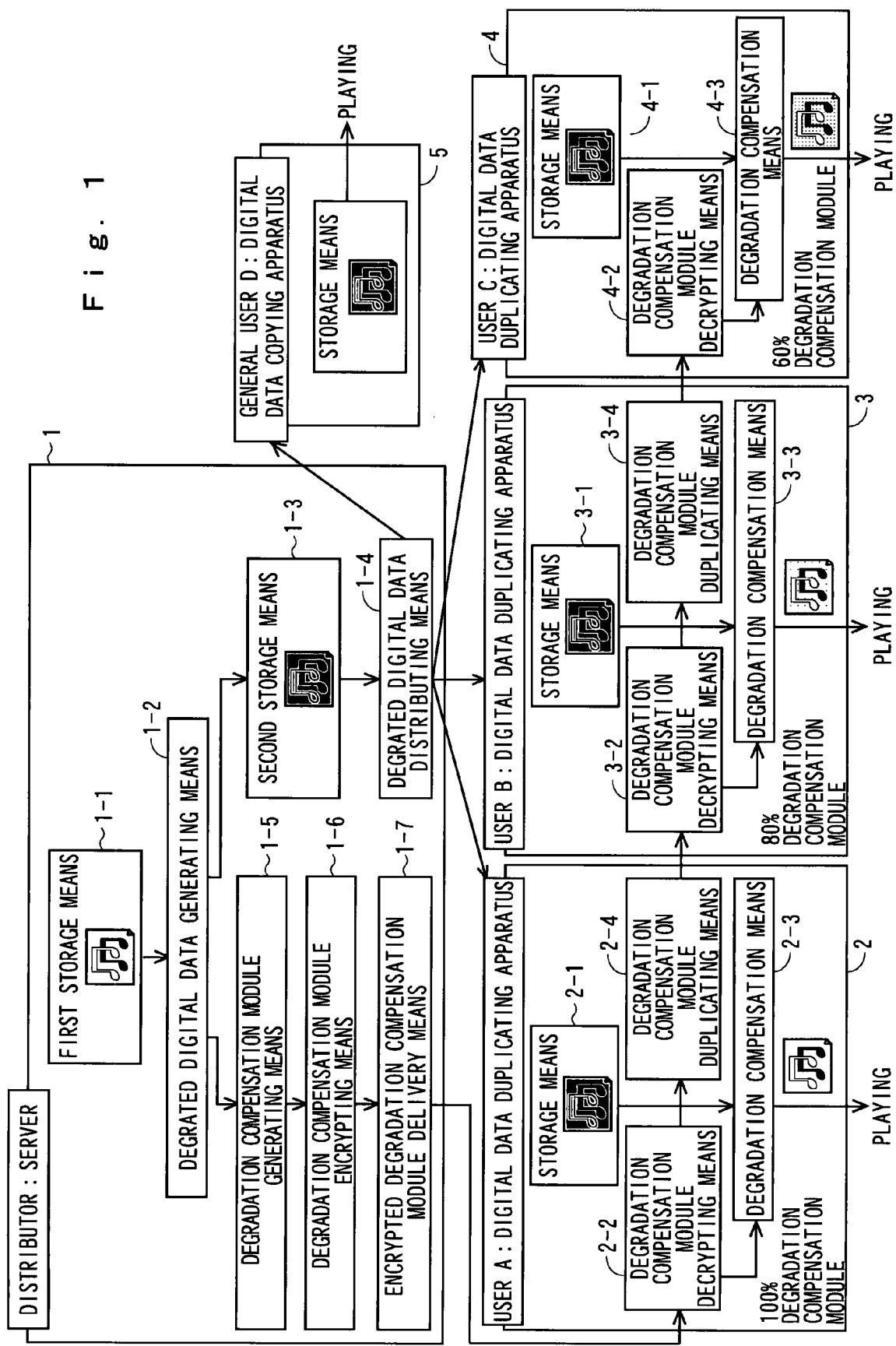
FIG. 1 is a block diagram schematically showing a method and apparatus for duplicating digital data accompanied by degradation according to an embodiment of the present invention.

The present invention will hereinafter be described with reference to the accompanying drawings. FIG. 1 is a block diagram schematically showing a method and an apparatus for duplicating digital data accompanied by degradation according to an embodiment of the present invention.

FIG. 1 shows a content source 1 (hereinafter referred to as a server) from which digital data is distributed, digital data duplicating apparatuses 2, 3, and 4 for respective users A, B, and C, and a digital data duplicating apparatus 5 for another general user D. Here, the user A has gotten a contract with a distributor for digital data distribution or has paid a charge for digital data, the user B tries to duplicate digital data through the user A, and the user C tries to duplicate digital data through the users A and B. Also, the general user D is a user trying to duplicate digital data on its own without getting a contract with the distributor for digital data distribution or paying a charge for digital data.

The server 1 includes: first storage means 1-1 for storing digital data with no quality degradation; degraded digital data generating means 1-2 for reversibly degrading the quality of the digital data that is stored in the first storage means 1-1 to generate degraded digital data; second storage means 1-3 for storing the degraded digital data that is generated in the degraded digital data generating means 1-2; degraded digital data distributing means 1-4 for distributing the degraded digital data that is stored in the second storage means 1-3 through a casting service such as broadcasting or multicasting; degradation compensation module generating means 1-5 for generating a 100% degradation compensation module for compensating by 100% the degradation of the degraded digital data that is generated in the degraded digital data generating means 1-2 to generate digital data with no quality degradation; degradation compensation module encrypting means 1-6 for encrypting the 100% degradation compensation module that is generated in the degradation compensation module generating means 1-5 with an encryption key for a user that has gotten a contract or has paid a charge for digital data, that is, the user A in the example of FIG. 1 to generate an encrypted degradation compensation module; and encrypted degradation compensation module delivery means 1-7 for delivering the encrypted degradation compensation module that is generated in the degradation compensation module encrypting means 1-6 to the user.

The digital data duplicating apparatus 2 for the user A includes: storage means 2-1 for obtaining and storing degraded digital data distributed from the degraded digital data distributing means 1-4 in the server 1; degradation compensation module decrypting means 2-2 for obtaining encrypted degradation compensation module delivered from the encrypted degradation compensation module delivery means 1-7 in the server 1 and for decrypting the module with the encryption key for the user A to obtain a 100% degradation compensation module; degradation compensation means 2-3 for compensating the degradation of the degraded digital data that is stored in the storage means 2-1 using the 100% degradation compensation module that is decrypted in the degradation compensation module decrypting means 2-2 to obtain and send digital data with no quality degradation to playing means; and degradation compensation module duplicating means 2-4 for obtaining the degradation compensation capability of the 100% degradation compensation module that is decrypted in the degradation compensation module decrypting means 2-2 to replicate the degradation compensation module as, for example, an 80% degradation compensation module and further for encrypting the module with an encryption key for a replication destination user, that is, the user B in the example of FIG. 1 to send as an encrypted degradation compensation module.

The digital data duplicating apparatus 3 for the user B has the same configuration as that of the digital data duplicating apparatus 2 for the user A. However, the degradation compensation module decrypting means 3-2 is adapted to decrypt an 80% degradation compensation module, and thereby the degradation compensation means 3-3 is adapted to obtain digital data with 80% quality degradation to playing means. Also, the degradation compensation module duplicating means 3-4 is adapted to further obtain the degradation compensation capability of the 80% degradation compensation module that is decrypted in the degradation compensation module decrypting means 3-2 to replicate the degradation compensation module as, for example, a 60% degradation compensation module and further to encrypt the module with an encryption key for a replication destination user, that is, the user C in the example of FIG. 1 to send as an encrypted degradation compensation module.

The digital data duplicating apparatus 4 for the user C also has the same configuration as that of the digital data duplicating apparatus 2 for the user A. However, the degradation compensation module decrypting means 4-2 is adapted to decrypt a 60% degradation compensation module, and thereby the degradation compensation means 4-3 is adapted to send digital data with 60% quality degradation to playing means. It is noted that the digital data duplicating apparatus 4 also includes degradation compensation module duplicating means, which can further obtain the degradation compensation capability of the degradation compensation module to send to another user, though not shown in the drawing.

The encryption keys for the users B and C may be fixed up in advance or during digital data replication between the users A and B and the users B and C. Alternatively, specific information of the device in the digital data duplicating apparatuses 2, 3, and 4 may be utilized as encryption keys for the users A, B, and C. Degradation compensation modules cannot be duplicated without such encryption keys and non-encrypted degradation compensation modules cannot be distributed.

The digital data duplicating apparatus 5 for the general user D also has the same configuration as that of the digital data duplicating apparatus 2 for the user A. However, since no degradation compensation module can be obtained, degraded digital data distributed from the degraded digital data distributing means 1-4 is obtained and sent directly to playing means.

Figures 2, 3:
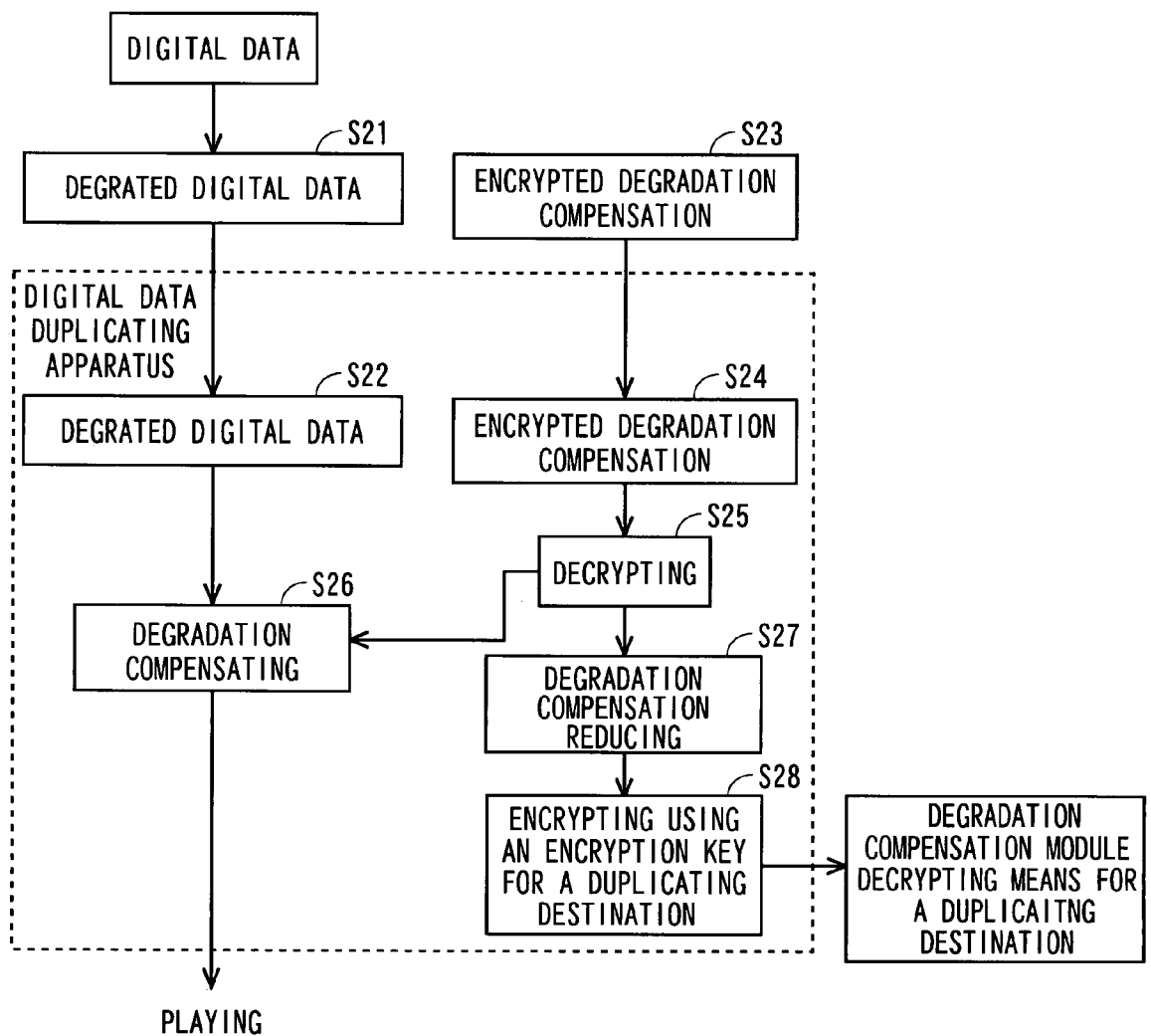
FIG. 2 is a flow chart showing an operation of the digital data duplicating apparatus.
FIG. 3 illustrates reduction in the degradation compensation capability of a degradation compensation module.

FIG. 2 is a flow chart showing an operation of the digital data duplicating apparatuses 2, 3, and 4. Digital data itself is distributed with being degraded from the degraded digital data distributing means 1-4 in the server 1 through a casting service such as broadcasting or multicasting (S21). The digital data has already been degraded when distributed from the server 1, and the degraded digital data spreads at a constant level of quality. The digital data duplicating apparatuses 2, 3, and 4 store the digital data that is delivered from the server 1 in their respective storage means (S22).

An encrypted degradation compensation module is also delivered from the encrypted degradation compensation module delivery means 1-7 in the server 1 to the digital data duplicating apparatus 2 for the user A to the user (user A) that has gotten a contract for digital data distribution or has paid a charge for digital data (S23). The encrypted degradation compensation module to be delivered from the server 1 to the user that has gotten a contract or has paid a charge for digital data is an encrypted 100% degradation compensation module whereby the degradation of digital data can be compensated by 100%.

The digital data duplicating apparatus 2 stores the encrypted degradation compensation module that is delivered from the encrypted degradation compensation module delivery means 1-7 in its storage means (S24), decrypts the module using its own encryption key, when obtain digital data, to obtain a 100% degradation compensation module (S25), and applies the module to the degraded digital data that has already been distributed to compensate the degradation thereof (S26). In this case, since the degradation is compensated by 100%, sending the degradation compensated digital data to the playing means allows the digital data to be played normally. Here, the arrangement that the degradation of the digital data is compensated only during play and the decrypted degradation compensation module and/or degradation compensated digital data are not accumulated could prevent the degradation compensated digital data from being distributed widely therefrom.

It is noted that if the degraded digital data distributed from the degraded digital data distributing means 1-4 is sent directly to the playing means, the degraded digital data is played while remaining degraded, as is the case in the general user D.

The user B can also receive an encrypted degradation compensation module from the server 1 to obtain digital data with no degradation, as is the case with the user A, if the user B has gotten a contract for digital data distribution or has paid a charge for digital data. The user B can also receive an encrypted degradation compensation module from the user A to replicate somewhat degraded digital data.

In the case of the user A allowing the user B to duplicate digital data through the user A, the degradation compensation module duplicating means 2-4 in the digital data duplicating apparatus 2 for the user A reduces the degradation compensation capability of the 100% degradation compensation module that is decrypted in the degradation compensation module decrypting means 2-2 (S27), replicates the degradation compensation module as, for example, an 80% degradation compensation module and further encrypts the module with an encryption key for a replication destination user, that is, the user B in the example of FIG. 1 (S28), and sends the module to the degradation compensation module decrypting means 3-2 in the digital data duplicating apparatus 3 for the user B as an encrypted degradation compensation module.

The user B can duplicate digital data with, for example, 80% degradation by receiving the encrypted degradation compensation module of which the degradation compensation capability is obtained from the user A. Similarly, the user C can duplicate digital data with, for example, 60% degradation by obtaining an encrypted degradation compensation module of which the degradation compensation capability is further obtained from the user B. Replication accompanied by degradation may be achieved successively across several generations subsequent to the user C by repeating the same procedure as above.

FIG. 3 illustrates reduction in the degradation compensation capability of a degradation compensation module. In FIG. 3, digital data (data 1 as complete data) is composed of five elements A, B, C, D, and E, and each circle represents data not degraded, while each cross represents data degraded. Also, data 2 (distributed data) is distributed from the server 1, and data 3 (zero-th generation), data 4 (first generation), and data 5 (second generation) are the data duplicated in the respective users A, B, and C.

The digital data can be obtained for each of the elements A, B, C, D, and E as well as for any combination thereof. In addition, the more the number of the same marks among the elements A, B, C, D, and E increases, the higher the quality of the data becomes, and if the marks for the elements A, B, C, D, and E are all the same, the data can be obtained at the highest quality.

First, digital data (data 1 as complete data) composed of elements A, B, C, D, and E is prepared. If the digital data is an RGB 8-bit bitmap, the elements constituting the digital data are defined, for example, as follows:

Element A: Upper four bits and header in each of the R, G, and B components,

Element B: Fourth lowest bit in each of the R, G, and B components,

Element C: Third lowest bit in each of the R, G, and B components,

Element D: Second lowest bit in each of the R, G, and B components, and

Element E: First lowest bit in each of the R, G, and B components.

Next, data 2 (distributed data) is prepared in advance as data in which the three elements C, D, and E are degraded. Here, to define degradation as, for example, "bit inversion", the lower three bits in each of the R, G, and B components are all inverted data in data 2 (distributed data). This data is distributed to each user.

Such degradation can also be compensated through "bit inversion". That is, such degradation is reversible. The degradation of data 2 (distributed data), in which the lower three bits in each of the R, G, and B components are all inverted, can be compensated completely by similarly inverting all of the lower three bits in each of the R, G, and B components, and thus complete data can be obtained.

A 100% degradation compensation module for inverting all the elements C, D, and E in each of the R, G, and B components is delivered to the user A. The user A can use this module and data 2 (distributed data) that has already been distributed to duplicate data 3 (zero-th generation). A degradation compensation module for inverting the elements C and D in each of the R, G, and B components is delivered to the user B. The user B can use this module and data 2 (distributed data) that has already been distributed to duplicate data 4 (first generation). A degradation compensation module for inverting only the element C in each of the R, G, and B components is delivered to the user C. The user C can use this module and data 2 (distributed data) that has already been distributed to duplicate data 5 (second generation). It is noted that the general user D can use only the elements A and B for play.

As described heretofore, in accordance with the above-described embodiment, since the preliminarily degraded digital data is provided through a casting service, etc., and the degradation compensation module of which the degradation compensation capability is obtained successively stepwise is distributed, it is possible to achieve a capability equivalent to replication accompanied by degradation only by exchanging a small amount of data after the digital data is once transmitted. For example, the digital data can be duplicated by transmitting the main digital data through a broadband connection and exchanging only the degradation compensation module individually.

Although the above-described embodiment shows the case of duplicating digital data between digital data duplicating apparatuses, it is also possible to build a system of degrading digital data with processing such as reproduction or time passage as a trigger by considering the replication source and destination as one digital data duplicating apparatus.

Another embodiment will hereinafter be described in which the replication source and destination are considered as one digital data duplicating apparatus and digital data is degraded at predetermined time intervals.

Figure 4:
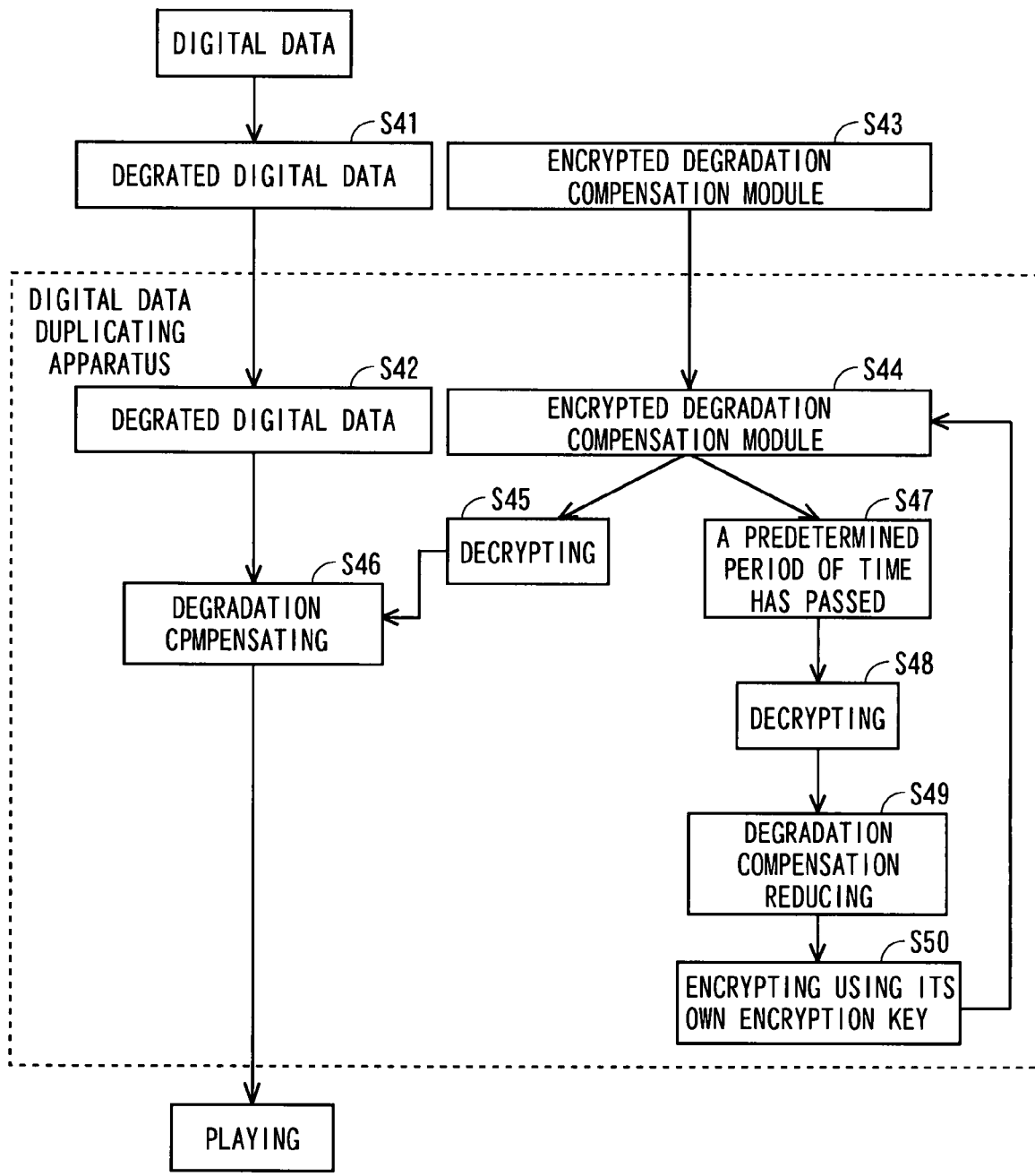
FIG. 4 is a flow chart showing another operation of the digital data duplicating apparatus.

FIG. 4 is a flow chart showing an operation of the digital data duplicating apparatuses 2, 3, and 4 in the case above. The digital data duplicating apparatuses 2, 3, and 4 store degraded digital data distributed from the server 1 through a casting service, etc., in their respective storage means (S42). An encrypted degradation compensation module is also delivered from the encrypted degradation compensation module delivery means 1-7 in the server 1 to the digital data duplicating apparatus 2 for an appropriate user as the user A (S43). It is noted that the encrypted degradation compensation module may be delivered to multiple users.

The digital data duplicating apparatus stores the encrypted degradation compensation module (S44), and then decrypts the module to obtain a 100% degradation compensation module (S45). Next, the 100% degradation compensation module is applied to the degraded digital data that has already been distributed to compensate the degradation thereof (S46), which allows the digital data to be obtained normally. The steps so far are the same as in FIG. 2.

Also, the degradation compensation module duplicating means in the digital data duplicating apparatus determines whether a predetermined period of time has passed after the encrypted degradation compensation module is delivered from the encrypted degradation compensation module delivery means 1-7 (S47). Then, if it is determined that the predetermined period of time has passed, the encrypted degradation compensation module is decrypted (S48) and the degradation compensation capability of the decrypted 100% degradation compensation module is obtained (S49). Thus, an 80% degradation compensation module, for example, is duplicated and further encrypted using its own encryption key (S50), to be an encrypted degradation compensation module in S44.

The degradation compensation capability is obtained stepwise at predetermined time intervals by repeating the steps S47 to S50 automatically at predetermined time intervals. The degradation compensation of the degradation compensation module can be compensated according to an instruction for digital data playing (S46) by decrypting the currently stored degradation compensation module (S45) and applying the module to the degraded digital data that has already been distributed from the server 1. The amount of degradation compensation in this case decreases as time passes after the encrypted degradation compensation module is delivered.

The present invention is not restricted to the above-described embodiments, and various modifications may be made. For example, the distribution of digital data and the delivery of an encrypted degradation compensation module from the server, and/or the exchange of the encrypted degradation compensation module between digital data duplicating apparatuses may be replaced by the delivery and receipt of a recording medium with the data and module stored therein.

Also, the two embodiments may be combined. That is, it may be arranged that the self-storing degradation compensation module is obtained as time passes and the degradation compensation capability of the degradation compensation module is obtained to be delivered to the other users.

It may further be arranged that as for a degradation compensation module for a special user, the obtained and delivered degradation compensation capability thereof is, reversely, improved as time (time and date) passes and thereby the special user can duplicate digital data with an improved amount of degradation.

What is claimed is:

1. A method for duplicating digital data accompanied by degradation, including duplicating a digital data degradation compensation module for compensating the degradation of digital data that is distributed from a content source and degraded reversibly in advance, the method comprising a degradation compensation capability reducing step of reducing the degradation compensation capability of the digital data degradation compensation module, performed when the digital data degradation compensation module is duplicated, wherein the digital data degradation compensation capability is hierarchized and the degradation compensation capability reducing step is adapted to reduce the degradation compensation capability stepwise with the repetition of duplicating the digital data degradation compensation module.

2. A method for duplicating digital data accompanied by degradation, including duplicating a digital data degradation compensation module for compensating the degradation of digital data that is distributed from a content source and degraded reversibly in advance, the method comprising a degradation compensation capability reducing step of reducing the degradation compensation capability of the digital data degradation compensation module, performed at predetermined time intervals after the digital data degradation compensation module is received, wherein the digital data degradation compensation capability is hierarchized and the degradation compensation capability reducing step is adapted to reduce the degradation compensation capability stepwise after the predetermined time intervals.

3. The method for duplicating digital data accompanied by degradation according to claims 1 or 2, wherein the digital data degradation compensation module is encrypted and the degradation compensation capability reducing step comprises: a first step of decrypting the digital data degradation compensation module; a second step of reducing the degradation compensation capability of the digital data degradation compensation module that is decrypted in the first step; and a third step of re-encrypting the digital data degradation compensation module that is reduced in the second step.

4. A digital data duplicating apparatus accompanied by degradation for duplicating digital data that is degraded reversibly in advance, the apparatus comprising:
storage means for obtaining and storing digital data that is distributed from a content source and degraded reversibly in advance;
digital data degradation compensation module obtaining means for obtaining a digital data degradation compensation module for compensating the degradation of the digital data from the content source or another digital data duplicating apparatus;
playing means for compensating the degradation of and outputting the digital data stored in the storage means using the digital data degradation compensation module that is obtained by the digital data degradation compensation module obtaining means; and
digital data degradation compensation module duplicating means for reducing the degradation compensation capability of the digital data degradation compensation module that is obtained by the digital data degradation compensation module obtaining means and for duplicating and sending the digital data degradation compensation module.

5. The digital data duplicating apparatus accompanied by degradation according to claim 4, wherein the digital data degradation compensation module is encrypted and the digital data degradation compensation module duplicating means comprises: decrypting means for decrypting the digital data degradation compensation module that is obtained by the digital data degradation compensation module obtaining means; degradation compensation capability reducing means for reducing the degradation compensation capability of the digital data degradation compensation module that is decrypted by the decrypting means; and encrypting means for re-encrypting the digital data degradation compensation module of which the degradation compensation capability is reduced by the degradation compensation capability reducing means.

* * * * *